United States Patent
Zhang et al.

(10) Patent No.: US 12,468,513 B2
(45) Date of Patent: *Nov. 11, 2025

(54) GENERATE A SCRIPT TO AUTOMATE A TASK ASSOCIATED WITH A WEBPAGE

(71) Applicant: Tiny Fish Inc., Cupertino, CA (US)

(72) Inventors: Shuhao Zhang, Cupertino, CA (US); Qi Zhai, Hillsborough, CA (US); Daniel Lawrence Schafer, Portola Valley, CA (US); Pavlo Dudka, Mountain View, CA (US); Mingyang Li, Bellevue, WA (US); Urvish Dipakkumar Thakker, Sunnyvale, CA (US); Mark Yi Chien Peng, Palo Alto, CA (US)

(73) Assignee: Tiny Fish Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/952,811

(22) Filed: Nov. 19, 2024

(65) Prior Publication Data

US 2025/0077197 A1    Mar. 6, 2025

Related U.S. Application Data

(63) Continuation of application No. 18/630,822, filed on Apr. 9, 2024, now Pat. No. 12,236,216, which is a
(Continued)

(51) Int. Cl.
*G06F 16/00* (2019.01)
*G06F 8/38* (2018.01)
*G06F 16/334* (2025.01)
*G06F 16/338* (2019.01)
*G06F 16/9538* (2019.01)
*G06F 40/20* (2020.01)

(52) U.S. Cl.
CPC .............. *G06F 8/38* (2013.01); *G06F 16/334* (2019.01); *G06F 16/338* (2019.01); *G06F 16/9538* (2019.01); *G06F 40/20* (2020.01)

(58) Field of Classification Search
None
See application file for complete search history.

(56) References Cited

U.S. PATENT DOCUMENTS

| 7,231,606 B2 | 6/2007 | Miller |
| 8,255,812 B1 | 8/2012 | Parparita |
| (Continued) | | |

FOREIGN PATENT DOCUMENTS

| CN | 103268337 | 8/2013 |
| CN | 106709062 | 5/2017 |
| (Continued) | | |

*Primary Examiner* — Jean M Corrielus
(74) *Attorney, Agent, or Firm* — Van Pelt, Yi & James LLP

(57) ABSTRACT

A query that includes one or more variables is received. The one or more variables correspond to one or more interactive elements. A large language model is utilized to generate a query response that associates one or more variables included in the query to the one or more interactive elements. A script is generated utilizing the query response that associates the one or more variables included in the query to the one or more interactive elements.

32 Claims, 17 Drawing Sheets

Related U.S. Application Data continuation-in-part of application No. 18/415,431, filed on Jan. 17, 2024, now Pat. No. 12,174,906.

(60) Provisional application No. 63/534,541, filed on Aug. 24, 2023.

(56) References Cited

U.S. PATENT DOCUMENTS

| | | | |
|---|---|---|---|
| 9,286,290 | B2 | 3/2016 | Allen |
| 9,641,591 | B1 | 5/2017 | Kolam |
| 9,811,248 | B1 | 11/2017 | Berg |
| 9,824,151 | B2 | 11/2017 | Freund |
| 10,296,571 | B2 | 5/2019 | Kosonen |
| 10,366,140 | B2 | 7/2019 | Butt |
| 10,382,379 | B1 | 8/2019 | Zhang |
| 10,521,106 | B2 | 12/2019 | Cao |
| 10,572,894 | B1 | 2/2020 | Traupman |
| 10,585,927 | B1* | 3/2020 | Liao ............... G06F 16/3349 |
| 10,628,630 | B1 | 4/2020 | Surace |
| 11,100,295 | B2 | 8/2021 | Hirzel |
| 11,748,243 | B2 | 9/2023 | Finkelstein |
| 12,010,076 | B1 | 6/2024 | Andrew |
| 12,014,192 | B2 | 6/2024 | Riva |
| 12,067,362 | B2 | 8/2024 | Tunstall-Pedoe |
| 12,073,180 | B2 | 8/2024 | Tunstall-Pedoe |
| 12,333,260 | B2* | 6/2025 | Shi ............... G06F 40/205 |
| 2006/0020481 | A1 | 1/2006 | Lee |
| 2006/0020515 | A1 | 1/2006 | Lee |
| 2007/0234217 | A1 | 10/2007 | Miller |
| 2009/0012969 | A1* | 1/2009 | Rail ............... G06F 16/951 |
| 2009/0083363 | A1 | 3/2009 | Kiciman |
| 2009/0083409 | A1 | 3/2009 | Kiciman |
| 2009/0083714 | A1 | 3/2009 | Kiciman |
| 2009/0089312 | A1* | 4/2009 | Chi ............... G06F 16/9535 |
| | | | 707/E17.135 |
| 2009/0100345 | A1 | 4/2009 | Miller |
| 2009/0327235 | A1 | 12/2009 | Coladonato |
| 2011/0015954 | A1 | 1/2011 | Ward |
| 2012/0192155 | A1 | 7/2012 | Silbey |
| 2012/0290936 | A1* | 11/2012 | Mahmud ............... G06F 16/954 |
| | | | 715/733 |
| 2015/0154158 | A1 | 6/2015 | Zeine |
| 2015/0309990 | A1 | 10/2015 | Allen |
| 2016/0042411 | A1 | 2/2016 | Avner |
| 2016/0196111 | A1* | 7/2016 | Pujari ............... H04M 3/4938 |
| | | | 715/728 |
| 2017/0061528 | A1 | 3/2017 | Arora |
| 2017/0091158 | A1 | 3/2017 | Zeine |
| 2017/0169118 | A1* | 6/2017 | Jhaj ............... G06F 3/0482 |
| 2017/0257393 | A1 | 9/2017 | De Barros |
| 2017/0277625 | A1* | 9/2017 | Shtuchkin ............... G06F 11/3688 |
| 2017/0300403 | A1* | 10/2017 | Ramraz ............... G06F 11/3414 |
| 2018/0060303 | A1 | 3/2018 | Sarikaya |
| 2018/0101537 | A1 | 4/2018 | Govindarajan |
| 2018/0184178 | A1 | 6/2018 | Hoeben |
| 2019/0050461 | A1* | 2/2019 | Schrader ............... G06F 16/9538 |
| 2019/0179940 | A1 | 6/2019 | Ross |
| 2019/0260750 | A1 | 8/2019 | Mehrdad |
| 2019/0279084 | A1 | 9/2019 | Darachi, Jr. |
| 2019/0340224 | A1 | 11/2019 | Akhoury |
| 2019/0340256 | A1 | 11/2019 | Kulkarni |
| 2020/0004798 | A1 | 1/2020 | Weinert, Jr. |
| 2020/0065377 | A1 | 2/2020 | Hirzel |
| 2020/0089597 | A1 | 3/2020 | Kastyshyn |
| 2020/0097303 | A1 | 3/2020 | O'Kane |
| 2020/0184960 | A1 | 6/2020 | Suzuki |
| 2020/0233707 | A1* | 7/2020 | Ramamurthy ............... G06F 9/5066 |
| 2020/0249963 | A1 | 8/2020 | Yeh |
| 2020/0285353 | A1* | 9/2020 | Rezazadeh Sereshkeh ............... G06F 9/453 |
| 2020/0334301 | A1* | 10/2020 | Walters ............... G06N 3/08 |
| 2020/0349215 | A1 | 11/2020 | Mcmurray |
| 2021/0019309 | A1 | 1/2021 | Yadav |
| 2021/0191986 | A1 | 6/2021 | Okajima |
| 2021/0256076 | A1 | 8/2021 | Mcmurray |
| 2021/0295382 | A1 | 9/2021 | Buchanan |
| 2021/0304064 | A1 | 9/2021 | Mudi |
| 2021/0311939 | A1* | 10/2021 | Shtilkind ............... G06F 16/168 |
| 2021/0392144 | A1 | 12/2021 | Vaidyanath |
| 2022/0269736 | A1* | 8/2022 | Walters ............... G06N 3/08 |
| 2022/0284064 | A1* | 9/2022 | Shaw ............... G06F 40/232 |
| 2023/0095006 | A1 | 3/2023 | Riva |
| 2023/0161972 | A1 | 5/2023 | Härmä |
| 2023/0195825 | A1* | 6/2023 | Rao ............... G06F 16/986 |
| | | | 715/235 |
| 2023/0274094 | A1 | 8/2023 | Tunstall-Pedoe |
| 2023/0393810 | A1 | 12/2023 | Lange |
| 2024/0242154 | A1 | 7/2024 | Jindal |
| 2024/0281446 | A1 | 8/2024 | Bathwal |
| 2024/0289360 | A1 | 8/2024 | Chepkwony |
| 2024/0303441 | A1 | 9/2024 | Sobhy Deraz |

FOREIGN PATENT DOCUMENTS

| | | | |
|---|---|---|---|
| CN | 108009183 | | 5/2018 |
| CN | 108769832 | | 11/2018 |
| CN | 111367414 | | 10/2020 |
| CN | 112540736 | | 3/2021 |
| CN | 114127672 A * | 3/2022 | ......... G06F 9/45512 |
| CN | 114647806 | | 6/2022 |
| CN | 114780893 | | 7/2022 |
| CN | 115017397 | | 9/2022 |
| CN | 117555539 A * | 2/2024 | ............... G06F 8/38 |
| EP | 3767567 | | 1/2021 |

\* cited by examiner

```
{
    header {
        login_btn
        search_box
        search_btn
    }
}
```

FIG. 1A

```
header {
    login btn
}
```

FIG. 1B

```
<hierarchy rotation="0">
    <node index="0" text="Login" class="android.widget.navigation"
        content-desc="" checkable="false" checked="false"
        clickable="false" enabled="true" focusable="false" focused="false" scrollable="false"
        long-clickable="false" password="false" selected="false" bounds="[0,1368] [980,1877]">
        <node index="0" text="" class="android.widget.button" content-desc="Login"
            clickable="true" enabled="true" focusable="false" focused="false" scrollable="false"
            long-clickable="false" password="false" selected="false" bounds="[106,1015] [137,1050]"/>
        <node index="0" text="Tap to Search" class="android.widget.TextInput"
            content-desc="Tap to search" checkable="false" checked="false"
            clickable="false" enabled="true" focusable="false" focused="false" scrollable="false"
            long-clickable="false" password="false" selected="false" bounds="[106,1415] [137,1457]"/>
        <node index="0" text="Search" class="android.widget.Button" content-desc="Search button"
            checkable="false" checked="false" clickable="true" enabled="true" focusable="false"
            focused="false" scrollable="true" long-clickable="false" password="false" selected="false"
            bounds="[148,1418] [269,1455]"/>
    </node>
</hierarchy>
```

FIG. 1C

```
{
    "tf_11": {
        "role": "navigation",
        "html_tag": "header"
        "children": {
          "tf_22": {
            "role": "button",
            "name": "login",
            "html_tag": "button"
          },
          "APjFqb": {
             "role": "combobox",
             "name": "Search",
             "html_tag": "textarea"
          },
          "tf_194": {
             "role": "button",
             "name": "Search",
             "html_tag": "button"
          }
      }
    },
    //All other HTML elements
}
```

FIG. 2A

```
{
  "role": "navigation",
  "attributes": {
    "bounds": "[0,1368] [980,1877]"
  },
  "children": [
    {
      "attributes": {
        "bounds": "[106,1015] [137,1050]",
        "id": ""
      },
      "html_tag": "button",
      "tf623_id": "32",
      "name": "Login",
      "role": "button"
    },
    {
      "attributes": {
        "bounds": "[106,1415] [137,1457]",
        "id": ""
      },
      "html_tag": "input",
      "tf623_id": "34",
      "name": "Tap to search",
      "role": "text_input"
    },
    {
      "attributes": {
        "bounds": "[148,1418] [269,1455]"
      },
      "children": [ ],
      "html_tag": "button",
      "tf623_id": "35",
      "name": "Search",
      "role": "button"
    }
  ]
}
```

FIG. 2B

```
{
  header {
    "login_btn": {
      "role": "button",
      "name": "login",
      "id": "tf_22",
      "html_tag": "button"
    },
    "search_box": {
      "role": "combobox",
      "name": "Search",
      "id": "APjFqb",
      "html_tag": "textarea"
    },
    "search_btn": {
      "role": "button",
      "name": "Search",
      "id": "tf_194",
      "html_tag": "button"
    }
  }
}
```

FIG. 3A

```
{
    "navigation": [
      {
        "login_button": {
          "role": "button",
          "tf623_id": "32",
          "html_tag": "button",
          "name": "Login",
          "attributes": {
            "bounds": "[106,1015] [137,1050]",
            "id": ""
          }
        },
        "search_input": {
          "role": "input",
          "tf623_id": "34",
          "html_tag": "text_input",
          "name": "Tap to search",
          "attributes": {
            "bounds": "[106,1415] [137,1457]",
            "id": ""
          }
        },
        "search_button": {
          "role": "button",
          "tf623_id": "35",
          "html_tag": "button",
          "name": "search",
          "attributes": {
            "bounds": "[148,1418] [269,1455]",
            "id": ""
          }
        }
      }
    ]
}
```

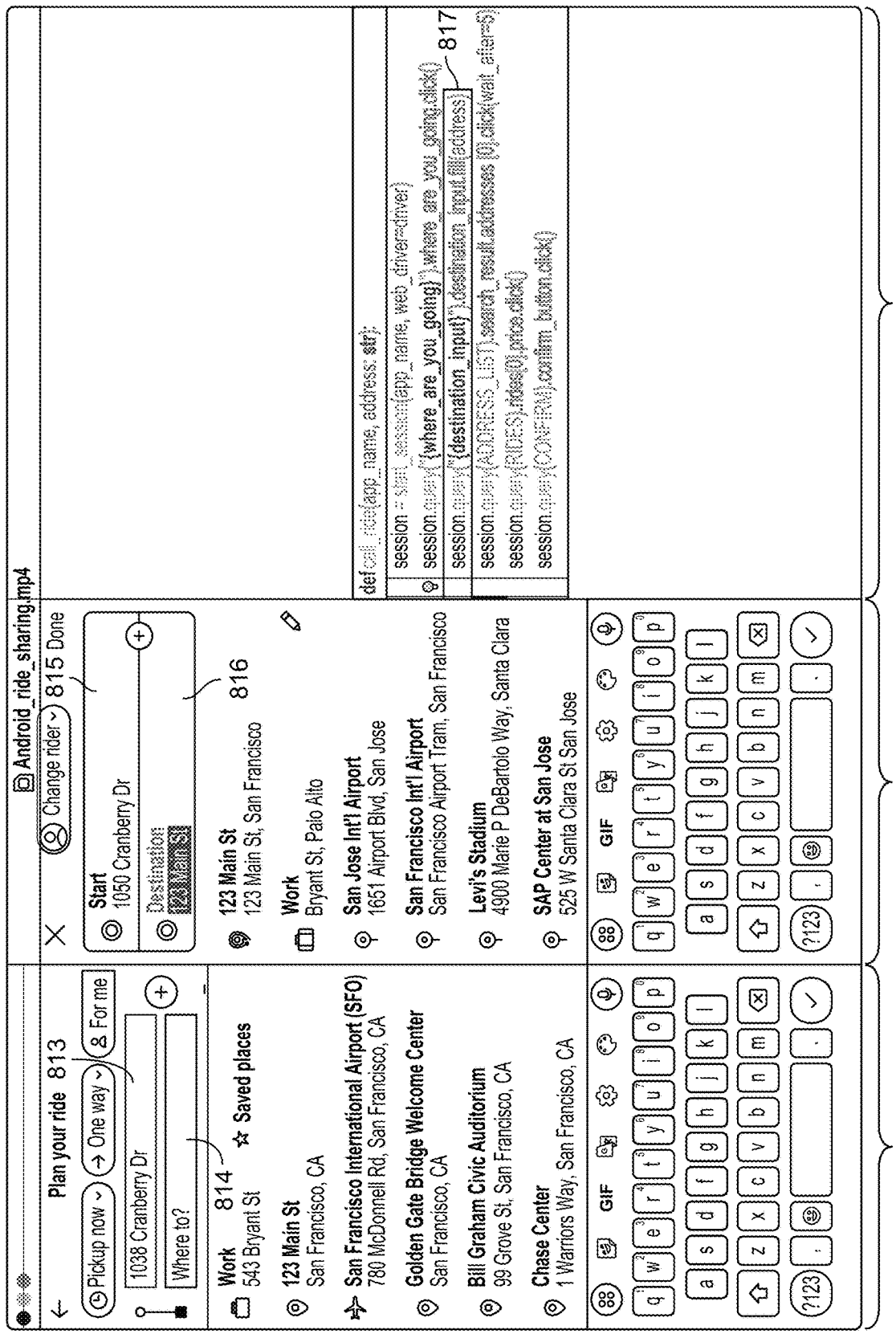

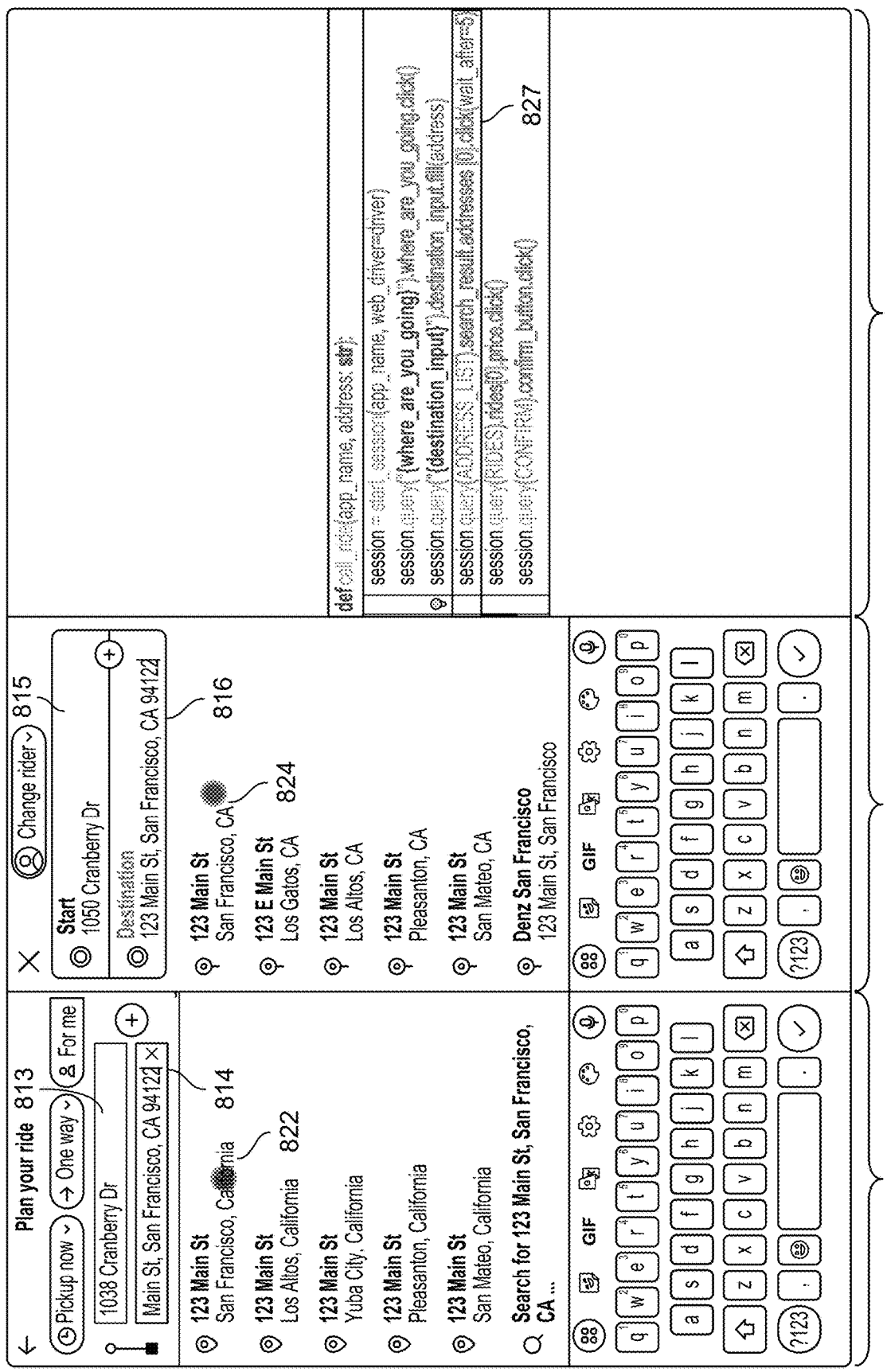

GENERATE A SCRIPT TO AUTOMATE A TASK ASSOCIATED WITH A WEBPAGE

CROSS REFERENCE TO OTHER APPLICATIONS

This application is a continuation of U.S. patent application Ser. No. 18/630,822 entitled GENERATE A SCRIPT TO AUTOMATE A TASK ASSOCIATED WITH A WEBPAGE filed Apr. 9, 2024, which is a continuation in part of U.S. patent application Ser. No. 18/415,431 entitled UTILIZING A QUERY RESPONSE TO AUTOMATE A TASK ASSOCIATED WITH A WEBPAGE filed Jan. 17, 2024, which claims priority to U.S. Provisional Patent Application No. 63/534,541 entitled WEB AGENT DESCRIPTION LANGUAGE filed Aug. 24, 2023, each of which is incorporated herein by reference for all purposes.

BACKGROUND OF THE INVENTION

A developer may generate a script to automate a task associated with a webpage or an application. The script is comprised of one or more instructions(s) that describe how to interact with the webpage or the application. The webpage or application is comprised of a plurality of elements. The script may be programmed to interact with a particular element in a particular manner based on an identifier associated with the particular element. However, the identifier associated with the particular element may be dynamic. Web pages and applications may be periodically updated. As a result, the script may stop working properly. This requires the developer to spend time and resources to fix the script or generate a new script.

BRIEF DESCRIPTION OF THE DRAWINGS

Various embodiments of the invention are disclosed in the following detailed description and the accompanying drawings.

FIG. 1A is an example of a query for a website in accordance with some embodiments.

FIG. 1B is an example of a query for a website in accordance with some embodiments.

FIG. 1C is an example of a user interface tree in accordance with some embodiments.

FIG. 2A is an example of processed webpage content in accordance with some embodiments.

FIG. 2B is an example of processed application content in accordance with some embodiments.

FIG. 3A is an example of a query response for a webpage in accordance with some embodiments.

FIG. 3B is an example of a query response for an application in accordance with some embodiments.

FIGS. 8A-8E illustrate an example of a script utilizing a query response in accordance with some embodiments.

DETAILED DESCRIPTION

Figure 4A:
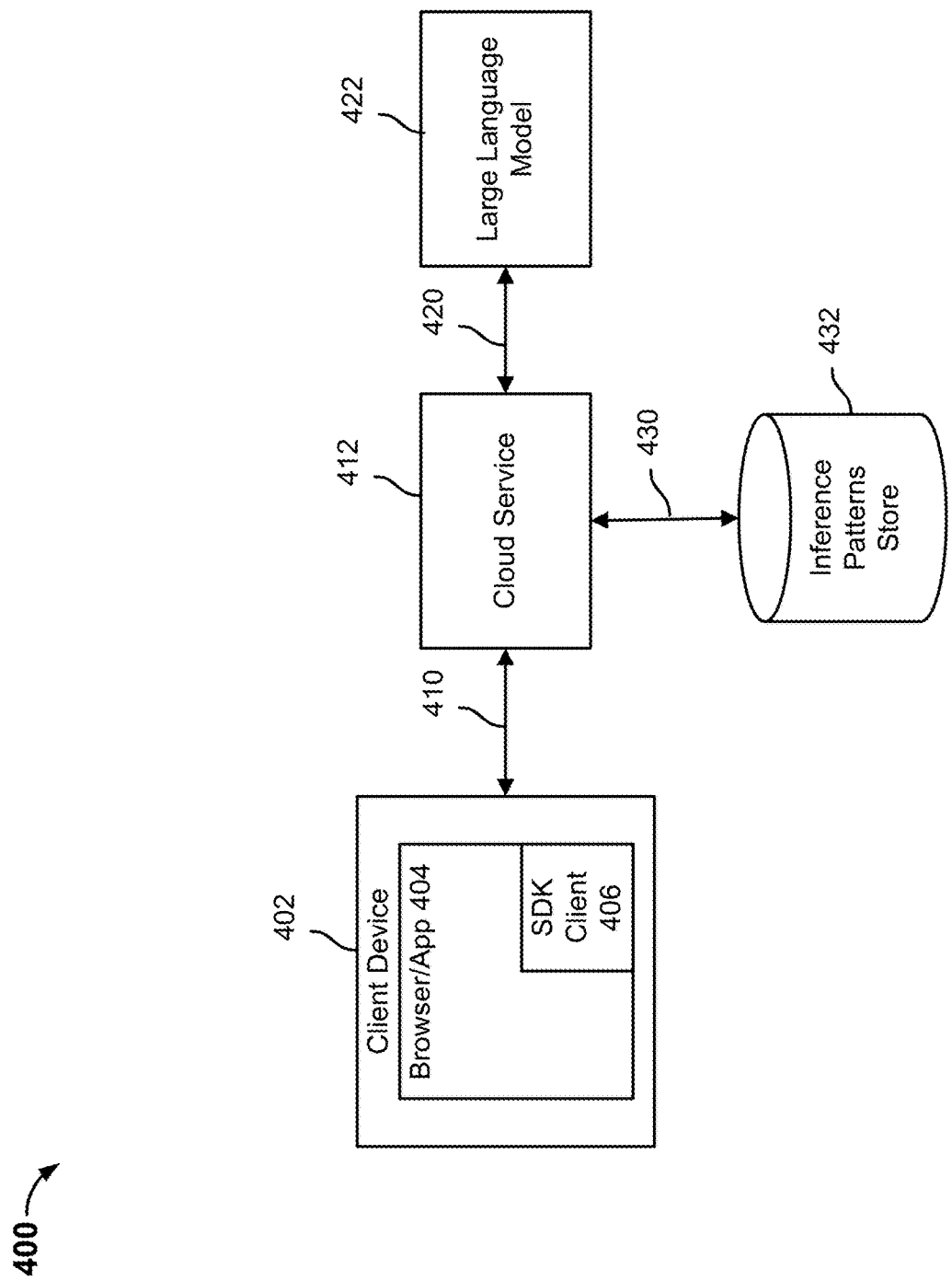
FIG. 4A is a block diagram illustrating a system to generate an adaptable script to automate a task associated with a webpage in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique to generate an adaptable script to automate a task associated with a webpage or an application is disclosed. The technique includes receiving a query from a client device. The query is a structured request, formulated in natural language, for specific elements from the webpage or application. The query serves as a representation to extract precise information from the webpage or application. The query is structured in a manner that signifies a relationship between a component and the webpage or application. The query is comprised of one or more variables that correspond to one or more specific elements associated with the webpage or application. The query is designed to be versatile across different types of websites and applications (e.g., e-commerce, business, nonprofit, entertainment, event, brochure, membership, forum, social media, etc.). The query can be conveniently applied to different websites or applications, ensuring consistency and efficiency.

FIG. 1A is an example of a query for a website in accordance with some embodiments. The example query may be utilized for a script that automates a booking process for a flight, a hotel, a car, a vacation, a reservation, etc. In the example shown, the query has specified a first variable "login_btn," a second variable "search_box," and a third variable "search_btn." The one or more variables included in a query may correspond to one or more interactive elements associated with a webpage or application. The first variable "login_btn" corresponds to a login button associated with the webpage or application, the second variable "search_box" corresponds to a search box associated with the webpage or application, and the third variable "search_btn" corresponds to a search button associated with the webpage or application.

FIG. 1B is an example of a query for a website in accordance with some embodiments. The example query may be utilized for a script associated with a webpage or an application having a login button within the navigation header. In the example shown, the query has specified a first variable "login_btn." The first variable "login_btn" corresponds to a login button associated with the webpage or application. In both examples of FIG. 1A and FIG. 1B, the variables are given names that correspond to elements associated with a webpage or application that the developer would like to utilize for a script associated with the webpage or application, but are unknown to the developer.

The technique further includes processing the webpage or application content. For webpages, the webpage content is processed as a human-friendly representation of the HMTL associated with the webpage, with notations for each element. For applications, the user interface content is extracted and processed into a consumable format (e.g., JSON, XML, screen shot, etc.). Processing the content (webpage content or application content) includes determining information associated with the elements. For webpage elements, the information associated with the elements include a corresponding "role," a corresponding "name," and a corresponding "html_tag." For applications elements, the information associated with the elements include a corresponding "bounds," a corresponding "role," a corresponding "name," and a corresponding "html_tag."

FIG. 2A is a simplified example of processed webpage content in accordance with some embodiments. In the example shown, for a particular web element, the processed webpage content indicates a "role," a "name," and an "html_tag." The "role" is a parameter that describes the role of the particular web element in an accessibility tree. The "name" is a parameter that represents the name of the web element as specified in the original webpage accessibility tree. The "html_tag" is a parameter that denotes the original html tag of the web element. Although the processed webpage content in the example includes information associated with three webpage elements, the processed webpage content may include information associated with n webpage elements.

FIG. 1C is an example of a user interface tree in accordance with some embodiments. For applications, a user interface tree, such as the user interface tree shown in FIG. 1C, is extracted from the user interface. The user interface tree is processed into a consumable format, such as the simplified example shown in FIG. 2B. The consumable format indicates, for an application element, a "role," a "name," and an "html_tag." The consumable format also includes, for an application element, a "bounds" value, which indicates the location or position of the application element on the user interface of the application.

The technique further includes utilizing a large language model (LLM) to generate a query response that associates one or more variables included in the query to one or more interactive elements included in the webpage or application. The processed content and the received query are provided to a cloud service. In response, the cloud service utilizes the processed content and the received query to generate a prompt for a LLM trained to understand the semantics of web content and/or application UI content. The notations for each element included in the processed content help the LLM to determine the purpose of the elements. The prompt, the received query, and the processed content are provided to the LLM. In response, the LLM generates a query response that associates one or more variables included in the query to one or more interactive elements included in the webpage or application and provides the query response to the cloud service.

FIG. 3A is an example of a query response for a webpage in accordance with some embodiments. The query response is a structured representation of specified web element nodes. The query response maps a variable included in the query to a corresponding webpage element included in the processed webpage content. Users may utilize this mapping to interact with the web element nodes by performing actions, such as click, input, etc. The interaction capability is similar to what a user could perform on the actual web page. In the example shown, for a particular web element, the query response indicates a "role," a "name," an "id," and an "html_tag." The "id" parameter determines a specified identifier for a particular web element. The LLM, indicated by the query response, has determined which web element corresponds to the variable "login_btn," which web element corresponds to the variable "search_box," and which web element corresponds to the variable "search_btn." Instead of using the specified identifier for a particular web element, a developer may utilize a variable included in the query that corresponds to the particular web element to generate the script to automate a task associated with the webpage.

FIG. 3B is an example of a query response for an application in accordance with some embodiments. Similar to the query response example in FIG. 3A, the query response example in FIG. 3B indicates, for a particular application element, a "role," a "name," an "id," and an "html_tag." In addition, the query response, for a particular application element, associates the particular application element with a corresponding "bounds" value." Instead of using the specified identifier for a particular application element, a developer may utilize a variable included in the query that corresponds to the particular application element to generate the script to automate a task associated with the application.

The cloud service may store the query response in an inference patterns store. The inference patterns preserves the mapping of response nodes to their corresponding HTML elements via patterns, such as XPath, DOM attributes and other distinctive patterns that can be used to locate an HTML element within a webpage. Storing the inference pattern in the inference pattern store enables the cloud service to generate the response for the same query in a webpage that has similar structure without prompting the LLM. This reduces latency and graphical processing unit (GPU) costs associated with utilizing the LLM to generate the query response. An example of a "similar webpage" is that, an e-commerce search result page, though search keywords are different, the search result pages are considered as "similar web pages" as they share the same page structure, and the stored inference patterns can be used to produce responses to queries on CPU instances.

The cloud service provides the query response to the client device. A browser or application associated with the client device includes application programming interface(s) (APIs) that enables object-oriented programming interfaces to be generated based on the query response. The APIs provide various functionality to interact with the web elements or application elements. The APIs are supported by one or more programming languages, such as Python, JavaScript, etc. Users associated with a client device may utilize the APIs to create web automation solutions for a wide range of everyday applications.

In the event a script becomes nonfunctional because the identifier associated with an element has been modified, the content (webpage content or application content) may be processed again to determine the updated information associated with the elements. The prompt, the query, and the updated processed content may be provided to determine an updated query response, which maps a variable associated with an old element identifier to a new element identifier. Instead of having a developer debug the script line-by-line to determine which element identifier has changed, implementing the LLM significantly reduces the time and resources needed to debug a nonfunctional script or to generate a new script. The LLM can effortlessly map the one or more variables included in the query to the one or more elements included in the processed content since the LLM is trained to understand the semantics of web content and/or UI content.

FIG. 4A is a block diagram illustrating a system to generate an adaptable script to automate a task associated with a webpage in accordance with some embodiments. In the example shown, system 400 includes a client device 402, a cloud service 412, a LLM 422, and an inference patterns store 432. Client device 402 may be a computer, a laptop, a desktop, a server, a tablet, a smart device, or any other computing device. Client device 402 includes browser/app 404. Browser/app 404 is configured to retrieve one or more webpages from the Internet.

Browser/app 404 is configured to receive a query associated with a webpage. The query is a structured request, formulated in natural language, for specific web elements from a webpage. The query is comprised of one or more variables that correspond to one or more specific web elements associated with the webpage.

Code associated with SDK client 406 is included in browser/app 404. SDK client 406 is configured to capture content associated with a webpage, process the content associated with the webpage into a specific format, and provide the processed content to cloud service 412. SDK client 406 includes functionality to interact with the annotated version of the web elements (e.g., the query response). SDK client 406 provides API(s) that enable actions, such as client, input, etc., to be performed. SDK client 406 is configured to provide error handling. An instruction step associated with a web automation solution may have an error handler. SDK client 406 is configured to cache a corresponding response for an instruction step for investigation and logging. In the event of an instruction execution failure not caused by web page changes, SDK client 406 is configured to continue and retry a script from a failed step without having to rerun prior steps. This ensures the scripting environment won't execute the same command or perform the same action repeatedly, especially for transaction-related tasks.

SDK client 406 is configured to determine, for a particular web element, a corresponding "role," a corresponding "name," and a corresponding "html_tag." The "role" is a parameter that describes the role of the particular web element in an accessibility tree. The "name" is a parameter that represents the name of the web element as specified in the original webpage accessibility tree. The "html_tag" is a parameter that denotes the original html tag of the web element.

SDK client 406 is configured to request cloud service 412 to generate a query response by providing to cloud service 412, via connection 410, the processed webpage content and the received query. Connection 410 may be a wired or wireless connection. Connection 410 may be the Internet, an intranet, a wireless area network, a personal area network, a wireless local area network, a virtual private network, etc.

In response, cloud service 412 utilizes the processed webpage content and the received query to generate a prompt for LLM 422. In some embodiments, LLM 422 is part of cloud service 412. In some embodiments, LLM 422 is a separate entity from cloud service 412.

The notations for each element included in the processed webpage content help LLM 422 to determine the purpose of the elements. LLM 422 is trained to understand the semantics of web content. The prompt, the query, and the processed webpage content are provided to LLM 422 via connection 420. Connection 420 may be a wired or wireless connection. Connection 420 may be the Internet, an intranet, a wireless area network, a personal area network, a wireless local area network, a virtual private network, etc.

In response, LLM 422 is configured to generate a query response and provide the query response to cloud service 412. The query response is an annotated representation of web elements as specified in the query. The query response maps a variable included in the query to a corresponding webpage element included in the processed webpage content. This response is designed to be user-friendly and easy to understand, in contrast to traditional HTML. It enhances the accessibility of web pages, allowing users to interact with the specified web elements as described in the query response. In addition to providing, for a particular web element, a corresponding "role," a corresponding "name," and a corresponding "html_tag," the query response also includes a corresponding "identifier" for the particular web element. The identifier denotes a specified identifier for a given web element. Instead of using the specified identifier for a particular web element, a developer may utilize a variable included in the query that corresponds to the particular web element to generate the script to automate a task associated with the webpage.

Cloud service 412 is configured to store the inference patterns derived from the query response in inference patterns store 432 via connection 430. Connection 430 may be a wired or wireless connection. Connection 430 may be the Internet, an intranet, a wireless area network, a personal area network, a wireless local area network, a virtual private network, etc. In some embodiments, inference patterns store 432 is included in a storage device that is local to or remote from cloud service 412. The query response preserves the mapping of response nodes to their corresponding HTML elements via XPaths, DOM attributes and other distinctive patterns for identifying HTML elements within a webpage. Storing the inference patterns in the inference patterns store enables the cloud service to generate the query response for the same query and similar webpage without prompting LLM 422 to generate the same query response on CPU instances. This reduces latency and GPU costs associated with utilizing LLM 422 to generate the query response.

Cloud service 412 is configured to provide the query response to client SDK 406. Client SDK 406 includes application programming interface(s) (APIs) that enables object-oriented programming interfaces to be generated based on the query response. The APIs provide various functionality to interact with the web elements. The APIs are supported by one or more programming languages, such as Python, JavaScript, etc. Users associated with a client device may utilize the APIs to create web automation solutions for a wide range of everyday applications.

Figure 4B:
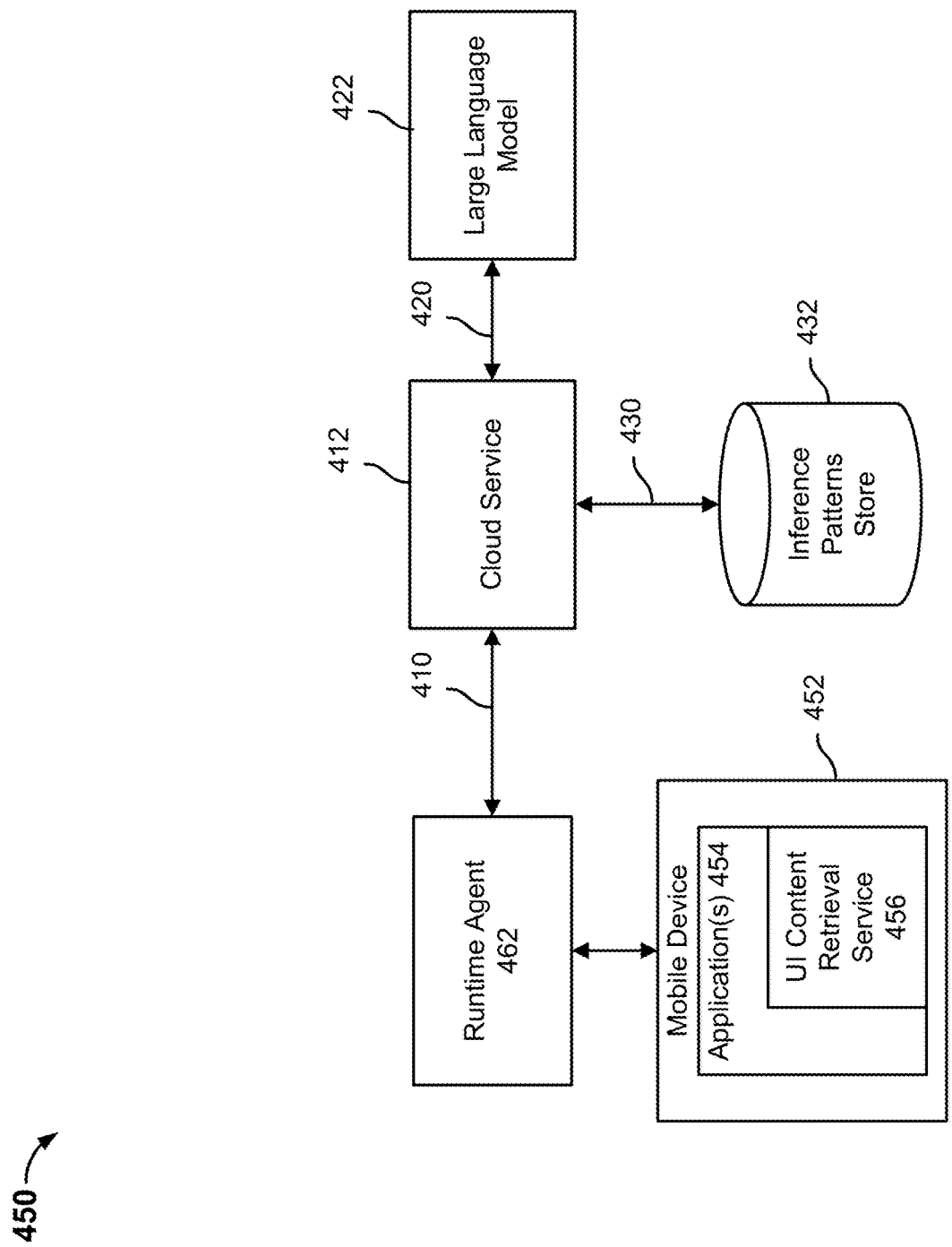
FIG. 4B is a block diagram illustrating a system to generate an adaptable script to automate a task associated with an application in accordance with some embodiments.

FIG. 4B is a block diagram illustrating a system to generate an adaptable script to automate a task associated with an application in accordance with some embodiments. In the example shown, system 450 includes a mobile device 452, a cloud service 412, a LLM 422, and an inference patterns store 432. Mobile device 452 may be a smart phone, a tablet, a handheld gaming device, a virtual reality headset, or any other portable computing device. In some embodiments, mobile device 452 is a client device, such as client device 402. Mobile device 452 includes one or more applications 454. Mobile device 452 is configured to receive a query from a user associated with mobile device 452.

The one or more applications 454, when executed by mobile device 452, have an associated UI that is viewable by a user associated with mobile device 452. The UI associated with the one or more applications have UI content, such as UI layout information and screen content, that is not easily accessible by the user associated with mobile device 452.

UI content retrieval service 456 is installed on mobile device 452 to enable the user associated with mobile device 452 to access the UI content associated with the one or more applications 454. UI content retrieval service 456 is configured to extract UI content from a UI associated with the one or more applications 454. In some embodiments, UI content retrieval service 456 is configured to extract UI content associated with an application that is running in the foreground of a display of mobile device 452. In some embodiments, UI content retrieval service 456 is configured to extract UI content associated with an application that is running in a background of the display of mobile device 452. UI content may include a UI layout, screen content, a screenshot, etc. In some embodiments, UI content retrieval service 456 is located on a separate device that communicates (wired or wirelessly) with client device 452. The wired connection may be a USB cable, lightning cable, or other type of mobile device cable. The wireless connection may be a Bluetooth connection, a Wi-Fi connection, an Airdrop connection, or other type of wireless connection.

Runtime agent 462 is configured to obtain the extracted UI content from UI content retrieval service 456 and process the obtained UI content into a consumable format (e.g., Javascript Object Notation (JSON), Extensible Markup Language (XML), screenshot, etc.). Runtime Agent 462 is configured to package the processed UI content with a user query and provide the packaged information as a request to cloud service 412. Runtime agent 462 is also configured to facilitate further communication with mobile device 452 (e.g., interacting with UI elements for automation purposes).

In some embodiments, runtime agent 462 is located on a device separate from mobile device 452, such as a client device. In some embodiments, runtime agent 462 is also installed on mobile device 452. In some embodiments, runtime agent 462 is installed on mobile device 452 as an application separate from UI content retrieval service 456. It is possible that in some embodiments, runtime agent 462 is installed on mobile device 452 in a same application as UI content retrieval service 456. However, it is desired to deploy UI content retrieval service 456 and runtime agent 462 across a plurality of devices in a uniform manner to reduce the amount of time and resources associated with debugging an error in UI content retrieval service 456 and/or runtime agent 462. For example, a standalone version of UI content retrieval service 456 and a version of UI content retrieval service 456 packaged with runtime agent 462 may be deployed. However, in the event there is a bug with UI content retrieval service 456, more time and resources are needed to debug both versions of UI content retrieval service 456 when compared to debugging either the standalone version of UI content retrieval service 456 or the version of UI content retrieval service 456 packaged with runtime agent 462.

In response to receiving the query and the packaged information, cloud service 412 utilizes the packaged information to generate a prompt for LLM 422. In some embodiments, LLM 422 is part of cloud service 412. In some embodiments, LLM 422 is a separate entity from cloud service 412.

The notations for each element included in the processed content help LLM 422 to determine the purpose of the elements. LLM 422 is trained to understand the semantics of UI content. The prompt, the query, and the processed UI content are provided to LLM 422 via connection 420. Connection 420 may be a wired or wireless connection. Connection 420 may be the Internet, an intranet, a wireless area network, a personal area network, a wireless local area network, a virtual private network, etc.

In response, LLM 422 is configured to generate a query response and provide the query response to cloud service 412. The query response is an annotated representation of application elements as specified in the query. The query response maps a variable included in the query to a corresponding UI element. The query response enhances the accessibility of application UIs, allowing users to interact with the specified elements as described in the query response. In addition to providing, for a particular element, a corresponding "role," a corresponding "name," and a corresponding "html_tag," the query response also includes a corresponding "identifier" and a corresponding "bounds" for the particular UI element. The identifier denotes a specified identifier for a given element. Instead of using the specified identifier for a particular UI element, a developer may utilize a variable included in the query that corresponds to the particular UI element to generate the script to automate a task associated with the application. The "bounds" value indicates a position or location of the particular element on a UI associated with the application.

Cloud service 412 is configured to store the inference patterns derived from the query response in inference patterns store 432 via connection 430. Connection 430 may be a wired or wireless connection. Connection 430 may be the Internet, an intranet, a wireless area network, a personal area network, a wireless local area network, a virtual private network, etc. In some embodiments, inference patterns store 432 is included in a storage device that is local to or remote from cloud service 412.

Cloud service 412 is configured to provide the query response to runtime agent 462, which uses the information in the query response to locate certain UI elements on a screen associated with an application 454 running on mobile device 452 and to interact with them to perform automation actions. Given the response from cloud service 412, runtime agent 462 is configured to facilitate interaction with UI elements by sending corresponding commands to mobile device 452 through a wired or wireless connection.

Figure 5A:
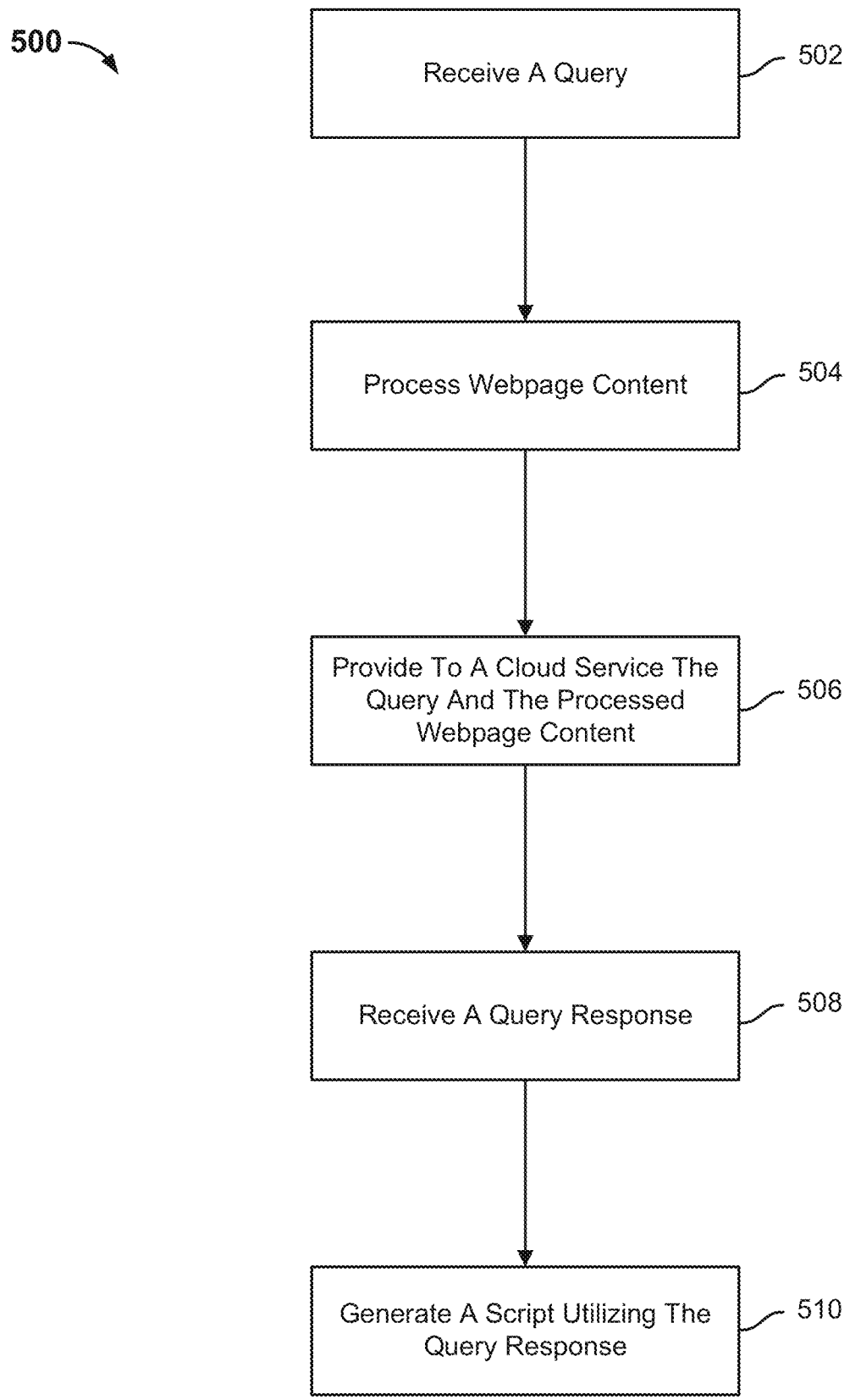
FIG. 5A is a flow diagram illustrating a process to generate an adaptable script to automate a task associated with a webpage in accordance with some embodiments.

FIG. 5A is a flow diagram illustrating a process to generate an adaptable script to automate a task associated with a webpage in accordance with some embodiments. In the example shown, process 500 may be implemented by a client SDK, such as client SDK 406.

At 502, a query is received. The query is a structured request, formulated in natural language, for specific web elements from a webpage. The query serves as a representation to extract precise information from the webpage. The query is structured in a manner that signifies a relationship between a component and the webpage. The query is comprised of one or more variables that correspond to one or more specific web elements associated with a webpage. The query is designed to be versatile across different types of websites.

At 504, webpage content is processed. The processed webpage is a human-friendly representation of the HMTL associated with the webpage, with notations for each element. For a particular web element, the processed webpage content indicates a "role," a "name," and an "html_tag." The "role" is a parameter that describes the role of the particular web element in an accessibility tree. The "name" is a parameter that represents the name of the web element as specified in the original webpage accessibility tree. The "html_tag" is a parameter that denotes the original html tag of the web element.

At 506, the query and the processed webpage content are provided to a cloud service.

At 508, a query response is received from the cloud service. The query response is a structured representation of specified web element nodes. The query response maps a variable included in the query to a corresponding webpage element included in the processed webpage content.

At 510, an automated task is generated utilizing the query response. Code associated with the automated task is generated utilizing the variables included in the query. For example, an automated task may include booking a flight on a travel website, purchasing a product on an e-commerce website, scheduling an appointment at a medical facility, etc. The variables "login_btn," "search_box," and "search_btn" from FIG. 1A may be utilized instead of "tf_22," "APjFqB," and "tf_194," respectively.

In the event an identifier associated with a web element changes due to an update in the web page, an automated task may not function properly because a variable included in the script is not correctly mapped to the correct web element. Steps 504-508 may be repeated to enable the LLM to determine a new mapping between the updated web element identifier and the variable included in the query. For example, the query response may map the variable "login_btn" to a web element having an identifier of "identifier_1." The web page may be updated such that the web element having the identifier of "identifier_1" now has an identifier of "identifier_2." Process 500 may be repeated to enable the LLM to update the mapping such that the variable "login_btn" is mapped to the web element having the identifier of "identifier 2."

In some embodiments, steps 504-508 are periodically performed (e.g., daily, weekly, monthly, etc.). In some embodiments, steps 504-508 are performed in response to a user command. In some embodiments, steps 504-508 are performed as a background process.

Instead of having a developer debug the script line-by-line to determine which web element identifier has changed, implementing the LLM significantly reduces the time and resources needed to debug a nonfunctional script or to generate a new script. The LLM can effortlessly map the one or more variables included in the query to the one or more web elements included in the processed webpage content since the LLM is trained to understand the semantics of web content.

Figure 5B:
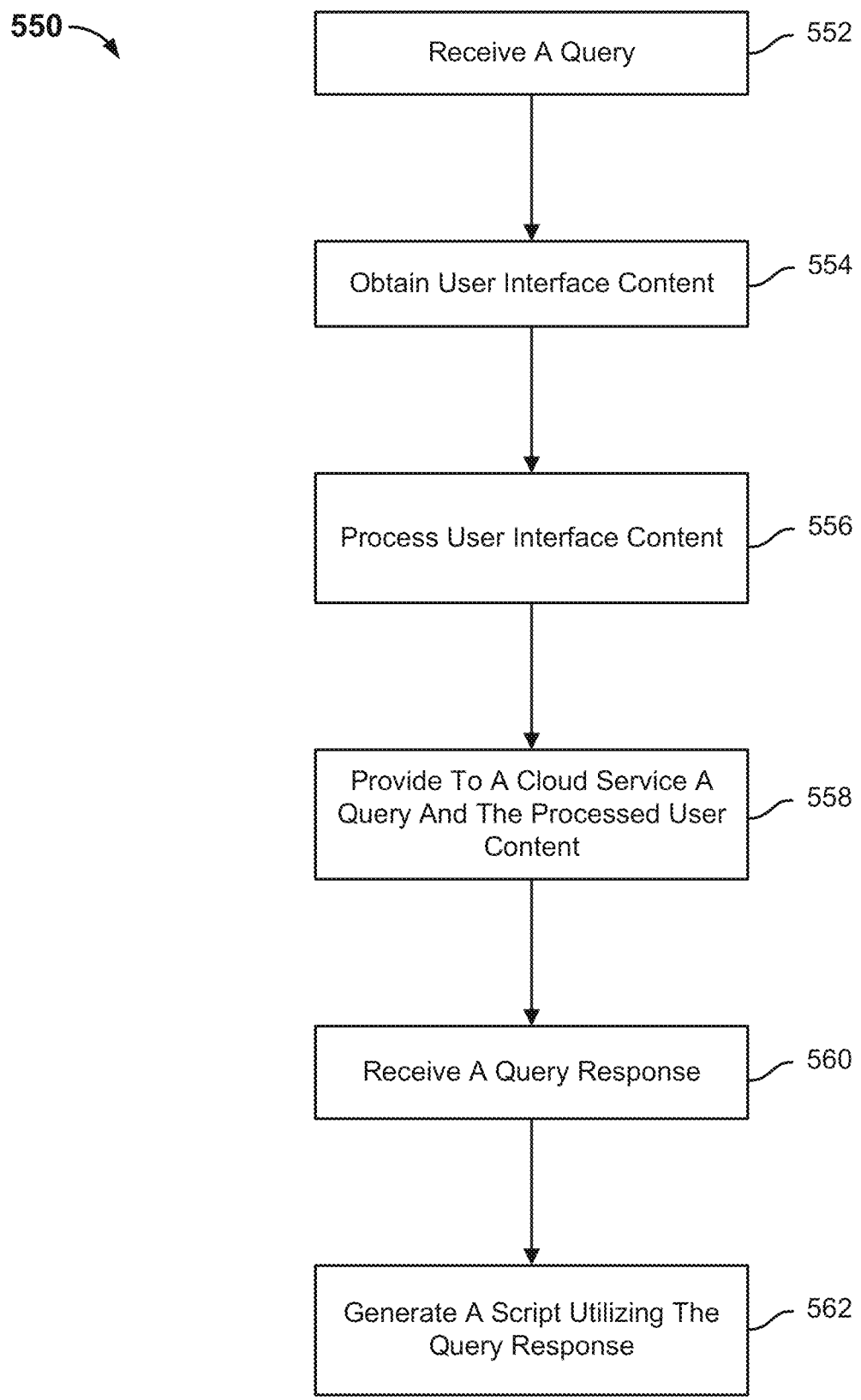
FIG. 5B is a flow diagram illustrating a process to generate an adaptable script to automate a task associated with an application in accordance with some embodiments.

FIG. 5B is a flow diagram illustrating a process to generate an adaptable script to automate a task associated with an application in accordance with some embodiments. In the example shown, process 550 may be implemented by a runtime agent, such as runtime agent 462.

At 552, a query is received. The query is a structured request, formulated in natural language, for specific web elements from an application. The query serves as a representation to extract precise information from the application. The query is structured in a manner that signifies a relationship between a component and the application. The query is comprised of one or more variables that correspond to one or more specific UI elements associated with the application. The query is designed to be versatile across different types of applications.

At 554, UI content associated with an application running on a mobile device is obtained. The application has an associated UI that is viewable by a user associated with the mobile device. The UI has associated content that may not be easily accessible by the user associated with the mobile device. A UI content retrieval service is installed on the mobile device to obtain the UI content associated with the application. The UI content may include a UI layout, screen content, a screenshot, etc. The UI content retrieval service provides the obtained screen content to a runtime agent.

At 556, the obtained UI content is processed into a consumable format. The runtime agent processes the obtained UI content into a consumable format, such as JSON, XML, a screenshot, etc. In some embodiments, the consumable format is pre-defined. In some embodiments, the obtained screen content is processed into a consumable format based on a type of task that is to be automated.

At 558, a query and the processed screen content is provided to a cloud service.

At 560, a query response is received from the cloud service. The query response is a structured representation of specified UI element nodes. The query response maps a variable included in the query to a corresponding UI element included in the processed user interface content.

At 562, a script for an automated task is generated utilizing the query response. Code associated with the automated task is generated utilizing the variables included in the query. For example, an automated task may include finding the cheapest ride between multiple ride-sharing apps, accepting requests on a social media platform from users that meet certain criteria, purchasing an item from an e-commerce platform when it is below a certain price, etc.). The variables "Login," "Tap to search," and "Search" from FIG. 2B may be utilized instead of "32," "34," and "35," respectively.

Figure 6:
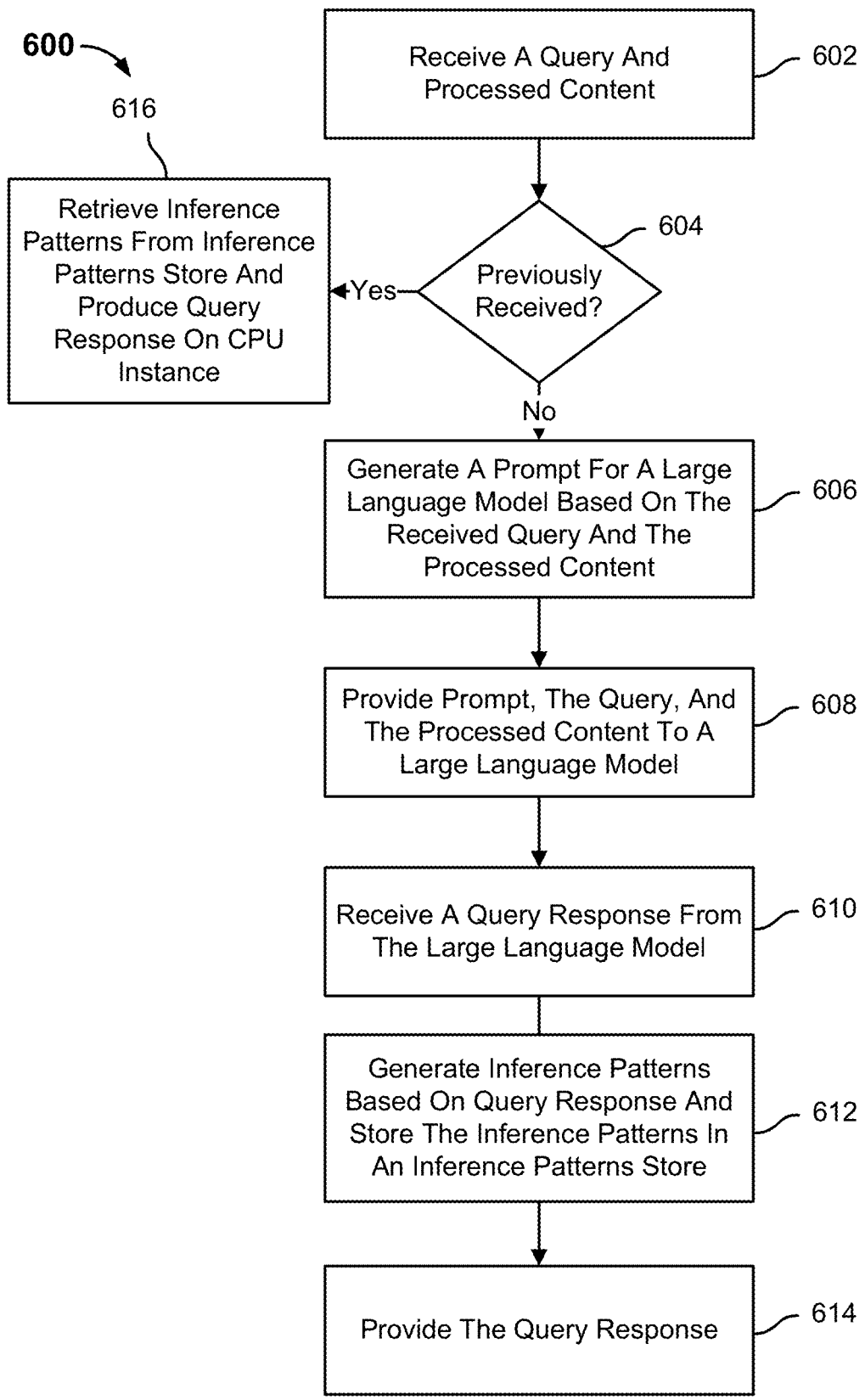
FIG. 6 is a flow diagram illustrating a process to generate a query response in accordance with some embodiments.

FIG. 6 is a flow diagram illustrating a process to generate a query response in accordance with some embodiments. In the example shown, process 600 may be implemented by a cloud service, such as cloud service 412.

At 602, a query and processed content are received from a client device. In some embodiments, the processed content is webpage content. In some embodiments, the processed content is UI information. The query is a structured request, formulated in natural language, for specific web elements from a webpage or application. The query is comprised of one or more variables that correspond to one or more specific elements associated with a webpage or application. The variables are given names that correspond to elements associated with a webpage or application that the developer would like to utilize for a script associated with the webpage but are unknown to the developer. The processed content is a human-friendly representation of the HMTL associated with the webpage or UI content, with notations for each element.

At 604, it is determined whether the query and the processed similar content have been previously received. In response to a determination that the query and the processed similar content has been previously received, process 600 proceeds to 616 where a query response is produced on CPU instances by using the inference patterns from the inference patterns store. In response to a determination that the query and the processed content have not been previously received, process 600 proceeds to 606.

At 606, a prompt for a LLM is generated based on the received query and the processed content. An example of a generated prompt is:

You are an expert in understanding the structure of the web page. You will be given a simplified Web Page accessibility tree (created following Aria spec) and a GraphQL-like query that is supposed to query various web page elements. Provide a hypothetical response to such a query in a GraphQL-like response format. Return only response in the following format:
{
  {response}
}

At 608, the prompt, the query, and the processed content are provided to the LLM.

At 610, a query response is received from the LLM. The query response is a structured representation of specified element nodes. The query response maps a variable included in the query to a corresponding element included in the processed webpage content or processed UI content. For each element, the query response may indicate a "role," a "name," an "id," and/or an "html_tag."

At 612, the query response is used to generate inference patterns which are saved in an inference patterns store. Storing the inference patterns in the inference patterns store enables the cloud service to generate the query response for the same query and similar webpages or user interfaces on CPU instances without prompting the LLM to generate the query response. This reduces latency and GPU costs associated with utilizing the LLM to generate the query response.

At 614, the query response is provided to the client device.

Figure 7:
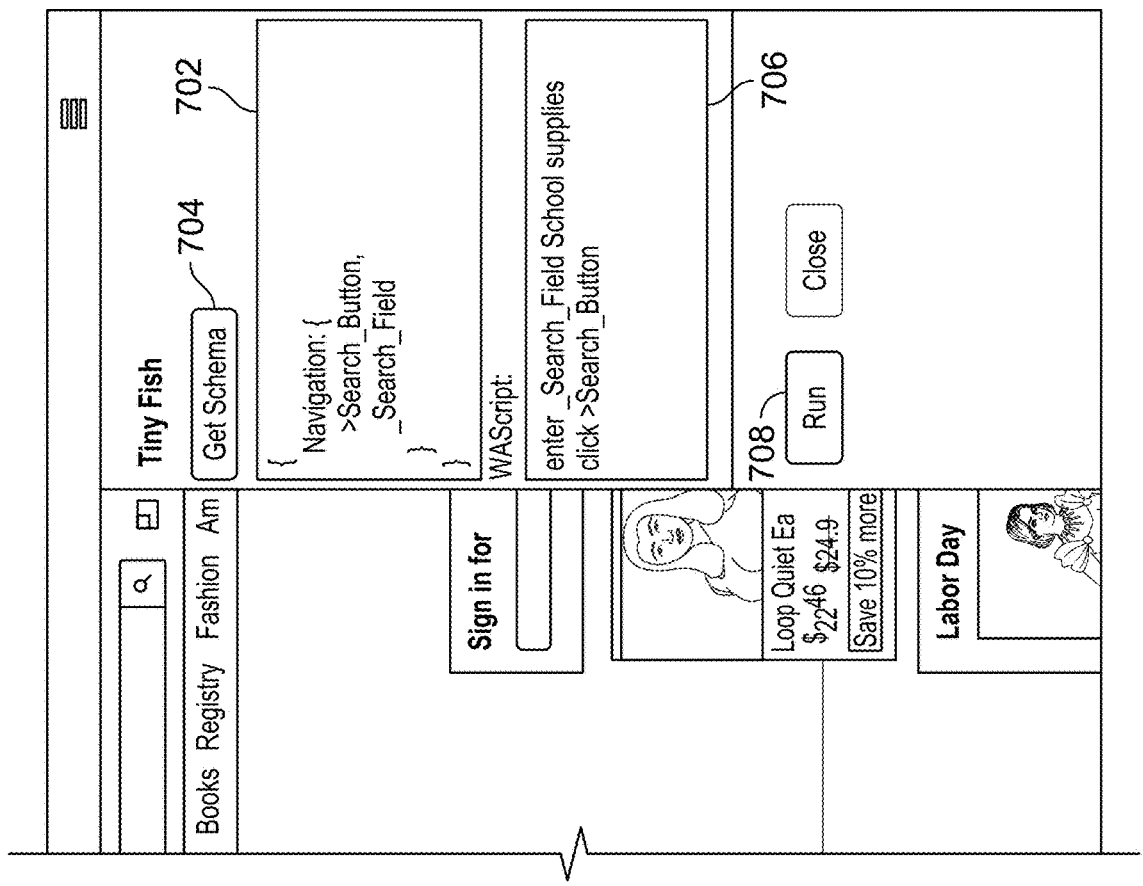
FIG. 7 is an example of a user interface to automate a task in accordance with some embodiments.

FIG. 7 is an example of a user interface to automate a task in accordance with some embodiments. In the example shown, user interface 700 may be implemented as a browser extension. User interface 700 includes a first area 702 that enables a user to define a query associated with a webpage. User interface 700 includes a first button 704 that causes processes 500 and 600 to be implemented. The browser extension fetches the query response to the query and returns an annotated representation of the requested web elements. User interface 700 includes a second area 706 that enables the user to define an automated task to be generated for the webpage using the one or more variables included in the query. A user may execute a script, such as Javascript, to interact with the web elements defined in the query. User 708 includes button 708 that enables the automated task to be implemented with respect to the webpage.

In the example shown, user interface 700 which may be implemented as a browser extension. It has the ability to specify a query for a particular web page and validate the syntax of the query. Also, it has the ability to format a query to the standard format and represent it in a visually appealing format which makes the query more human readable. The user extension also aids in visualizing the query. It also has the ability to fetch response for a given query and visualize the response of the query with the user interface. So, the user interface has the capability to specify the query and fetch the query response. When the user interface is implemented as a browser extension it also enables one to visualize the response of the query in the browser and see the actual DOM nodes corresponding to the response of the query.

FIGS. 8A-8E illustrates an example of a runtime agent facilitating interaction with UI elements associated with an application in accordance with some embodiments. In the example shown, a query response is utilized to develop a script called "call_ride" for two ride-sharing applications. Although the example depicts a script being developed for two different applications, the query response may be utilized to develop a script for 1:n applications.

Figure 8A:
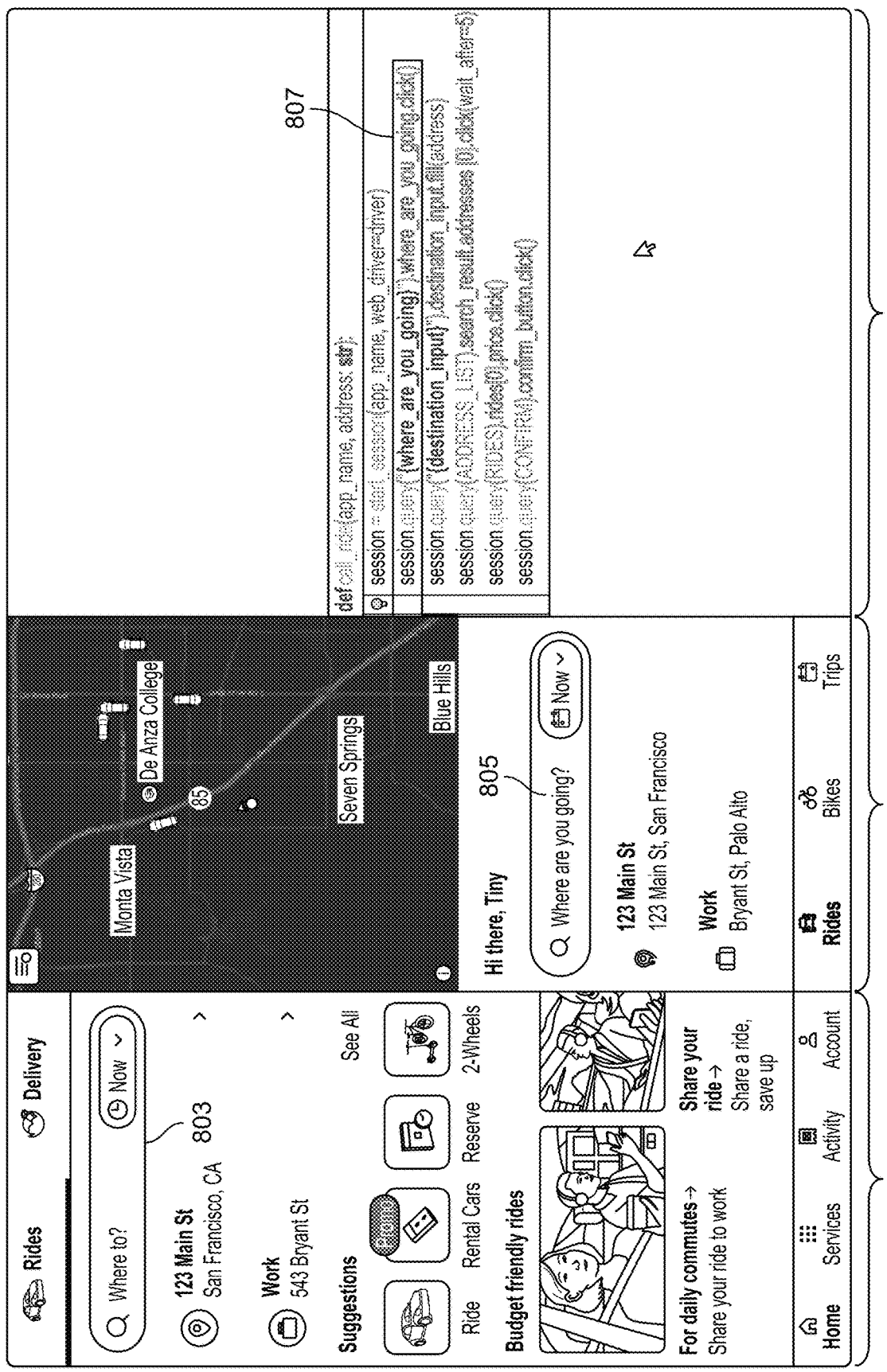

FIG. 8A depicts a first application 802 having a first user interface that includes user interface element 803 and a second application 804 having a second user interface that includes user interface element 804. User interface element 803 and user interface element 805 enable a user to specify a destination location. Instead of interacting (e.g., click or touch) with user interface element 803 or user interface element 805 utilizing the variable names defined by the first application 802 and the second application 804, respectively, script 806 may execute line 807 to interact with user interface element 803 or user interface element 805 utilizing a variable included in a query that the LLM has determined to correspond to user interface element 803 and user interface element 805. In the example shown, the "variable" in the query is "where_are_you_going."

FIG. 8B depicts the first application 802 having a second user interface that includes user interface elements 813, 814 and the second application 804 having a second user interface that includes user interface elements 815, 816. User interface elements 813, 815 enable a start location for a ride to be inputted. User interface elements 814, 816 enable a destination location for the ride to be inputted. Instead of interacting with user interface element 813 or user interface element 815 utilizing the variables defined by the first application 802 and the second application 804, respectively, script 806 may execute line 807 to interact with user interface element 813 and/or user interface element 815 utilizing a variable included in a query that the LLM has determined to correspond to user interface element 813 and user interface element 815. Script 806 may input a value for user interface elements 813, 815 based on location information associated with the mobile device with which the script is interacting. The location information associated with the mobile device may include global positioning system (GPS) information, stored location information (e.g., home, work, etc.), etc.

Similarly, script 806 may execute line 817 to interact with user interface element 814 and/or user interface element 816 utilizing a variable included in a query that the LLM has determined to correspond to user interface elements 814 and user interface element 816 instead of utilizing the variables defined by the first application 802 and the second application 804, respectively. In the example shown, the variable in the query corresponding to user interface elements 814, 816 is "destination_input." In response to interacting with user interface element 814 and/or user interface element 816, as seen in FIG. 8C, script 806 executes line 827 to query an address database to find a list of addresses based on the start location and the destination location. Script 806 executes line 827 to determine a complete address for the start location and/or the destination location. Script 806 is configured to select a start location and/or a destination location that matches a likely start location and a likely destination location that is determined based on the location information associated with the mobile device (e.g., GPS information). In the example shown, script 806 has selected the value associated with user interface element 822 to be inputted into user interface element 814 and the value associated with user interface element 824 to be inputted into user interface element 816.

In some embodiments, script 806 inputs a value for user interface elements 814, 816 based on an expected destination for the user. The expected destination may be obtained from a calendar application or other application installed on the mobile device. In some embodiments, the expected destination is determined based on historical location trends associated with the mobile device. In some embodiments, the expected destination is determined based on contextual information associated with the mobile device (e.g., time, date, weather, tickets in e-wallet, etc.).

Figure 8D:
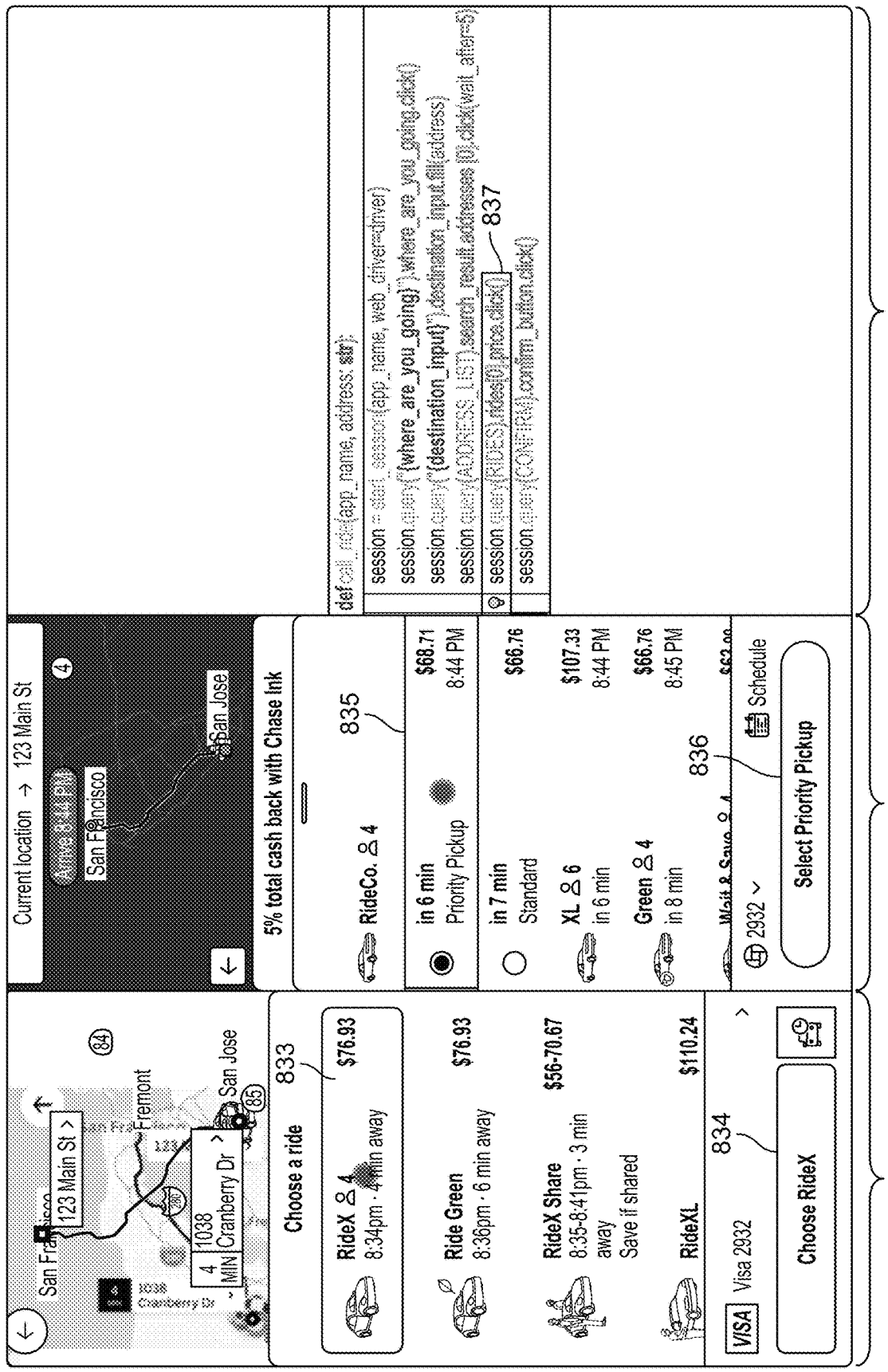

After a start location and a destination location have been established, as seen in FIG. 8D, script 806 executes line 837 to determine potential available vehicles and corresponding costs for the first application 802 and the second application 804. Line 847 may cause script 806 to select an option based on price. In some embodiments, an option is selected based on other factors, such total expected duration of ride, type of vehicle, etc. Script 806 may interact with user interface element 833 and/or user interface element 835 utilizing a variable included in a query that the LLM has determined to correspond to user interface element 833 and user interface element 835 instead of utilizing the variables defined by the first application 802 and the second application 804, respectively. In response to interacting with user interface elements 833, 835, the corresponding options have been selected. Script 806 may interact with user interface elements 834, 836 to select the ride option utilizing a variable included in a query that the LLM has determined to correspond to user interface elements 834 and user interface element 836 instead of utilizing the variables defined by the first application 802 and the second application 804, respectively.

Figure 8E:
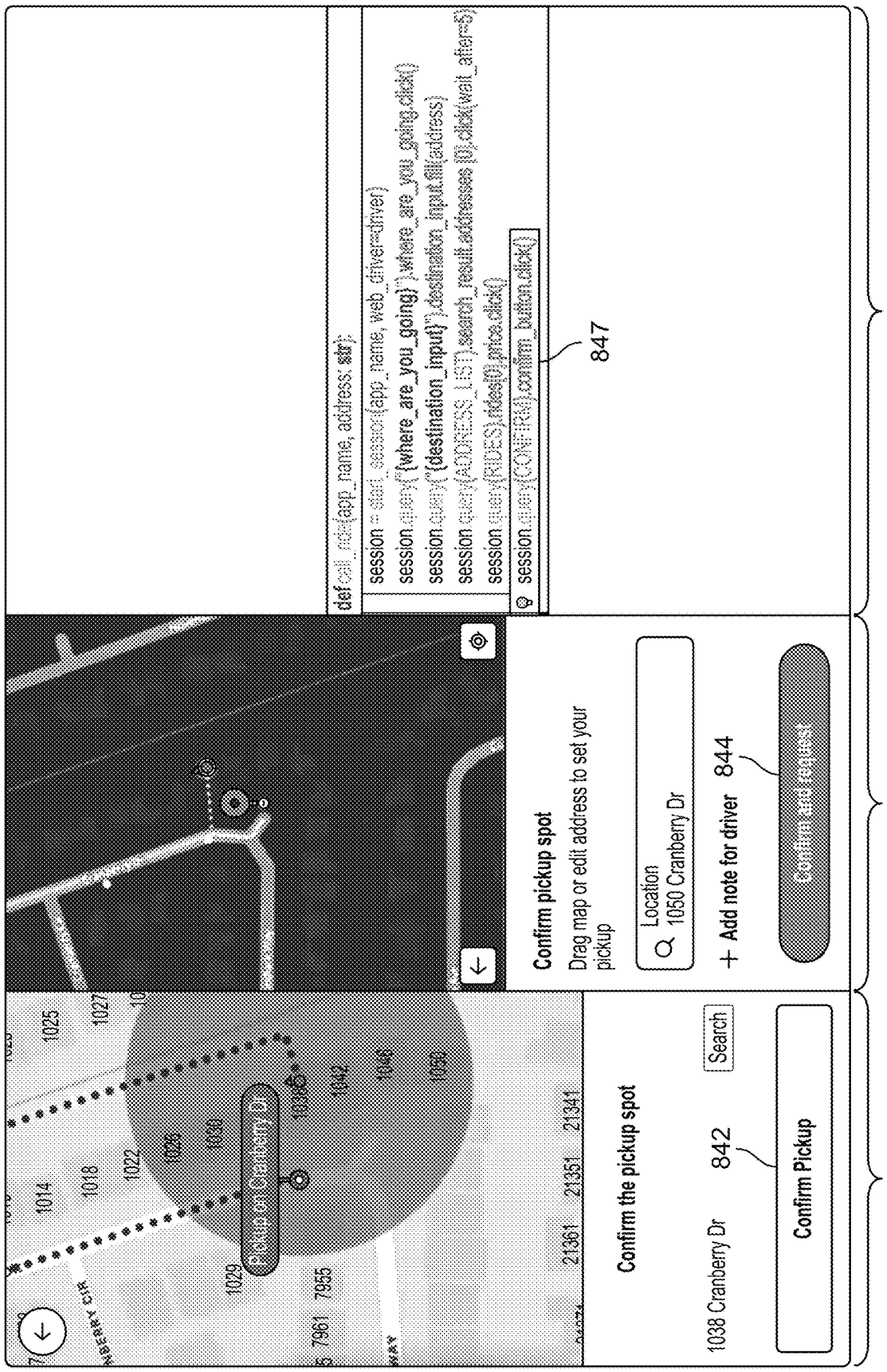

After a ride option has been selected, as seen in FIG. 8E, script 806 executes line 847 to confirm and request a vehicle. Script 806 may interact with user interface element 842 and/or user interface element 844 utilizing a variable included in a query that the LLM has determined to correspond to user interface element 842 and user interface element 844 instead of utilizing the variables defined by the first application 802 and the second application 804, respectively.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a query that includes one or more variables, wherein the one or more variables correspond to a first set of one or more interactive elements;
processing the first set of one or more interactive elements to determine one or more corresponding parameters associated with the one or more interactive elements;
providing to a cloud service the query that includes the one or more variables and the one or more corresponding parameters associated with the one or more interactive elements included in the first set, wherein the cloud service generates a prompt based on the query and the one or more corresponding parameters associated with the one or more interactive elements and provides the prompt to a large language model to generate a query response that maps the one or more variables included in the query to the first set of the one or more interactive elements; and generating a script utilizing the one or more variables included in the query based on the query response received from the large language model that maps the one or more variables included in the query to the first set of the one or more interactive elements.

2. The method of claim 1, wherein the first set of the one or more interactive elements are associated with a webpage.

3. The method of claim 1, wherein the first set of the one or more interactive elements are associated with an application.

4. The method of claim 3, further comprising obtaining user interface content associated with the application.

5. The method of claim 4, wherein the user interface content associated with the application is extracted from a user interface tree associated with the application.

6. The method of claim 5, wherein the user interface content associated with the application is extracted by a user interface content retrieval service associated with a device on which the application is installed.

7. The method of claim 6, wherein the extracted user interface content associated with the application includes a user interface layout, screen content, or a screenshot.

8. The method of claim 6, wherein the user interface content retrieval service is installed on the device.

9. The method of claim 6, wherein the user interface content retrieval service is installed on a second device separate from the device.

10. The method of claim 4, further comprising processing the user interface content associated with the application into a consumable format.

11. The method of claim 10, wherein the consumable format is XML, JSON or a screenshot.

12. The method of claim 10, wherein the processed user interface content associated with the application includes location information for the first set of the one or more interactive elements.

13. The method of claim 10, wherein the one or more corresponding parameters associated with the one or more interactive elements include a role, a name, and/or a tag.

14. The method of claim 1, wherein the large language model is configured to generate the query response in response to receiving the prompt.

15. The method of claim 1, further comprising receiving the query response from the large language model via the cloud service.

16. A system, comprising:
a processor configured to:
receive a query that includes one or more variables, wherein the one or more variables correspond to a first set of one or more interactive elements;
process the first set of one or more interactive elements to determine one or more corresponding parameters associated with the one or more interactive elements;
provide to a cloud service the query that includes the one or more variables and the one or more corresponding parameters associated with the one or more interactive elements included in the first set, wherein the cloud service is configured to generate a prompt based on the query and the one or more corresponding parameters associated with the one or more interactive elements and provide the prompt to a large language model to generate a query response that maps one or more variables included in the query to the first set of the one or more interactive elements; and generate a script utilizing the one or more variables included in the query based on the query response received from the large language model that maps the one or more variables included in the query to the first set of one or more interactive elements; and a memory coupled to the processor and configured to provide the processor with instructions.

17. The system of claim 16, wherein the first set of the one or more interactive elements are associated with an application.

18. The system of claim 17, wherein the processor is configured to obtain user interface content associated with the application that is extracted from a user interface tree associated with the application.

19. The system of claim 18, wherein the processor is further configured to process the user interface content associated with the application into a consumable format.

20. The system of claim 19, wherein the consumable format is XML, JSON or a screenshot.

21. The system of claim 19, wherein the processed user interface content associated with the application includes location information for the first set of the one or more interactive elements.

22. The system of claim 19, wherein the one or more corresponding parameters associated with the one or more interactive elements include a role, a name, and/or a tag.

23. The system of claim 17, wherein the processor is further configured to obtain user interface content associated with the application.

24. The system of claim 23, wherein the user interface content associated with the application is extracted from a user interface tree associated with the application.

25. The system of claim 24, wherein the user interface content associated with the application is extracted by a user interface content retrieval service associated with a device on which the application is installed.

26. The system of claim 25, wherein the extracted user interface content associated with the application includes a user interface layout, screen content, or a screenshot.

27. The system of claim 25, wherein the user interface content retrieval service is installed on the device.

28. The system of claim 25, wherein the user interface content retrieval service is installed on a second device separate from the device.

29. The system of claim 16, wherein the first set of the one or more interactive elements are associated with a webpage.

30. The system of claim 16, wherein the large language model is configured to generate the query response in response to receiving the prompt.

31. The system of claim 16, wherein the processor is further configured to receive the query response from the large language model via the cloud service.

32. A computer program product embodied in a non-transitory computer readable medium and comprising computer instructions for:

receiving a query that includes one or more variables, wherein the one or more variables correspond to a first set of one or more interactive elements;

processing the first set of one or more interactive elements to determine one or more corresponding parameters associated with the one or more interactive elements;

providing to a cloud service the query that includes the one or more variables and the one or more corresponding parameters associated with the one or more interactive elements included in the first set, wherein the cloud service generates a prompt based on the query and the one or more corresponding parameters associated with the one or more interactive elements and provides the prompt to a large language model to generate a query response that maps the one or more variables included in the query to the first set of the one or more interactive elements; and generating a script utilizing the one or more variables included in the query based on the query response received from the large language model that maps the one or more variables included in the query to the first set of one or more interactive elements.

* * * * *